US009464357B2

(12) United States Patent
Herold et al.

(10) Patent No.: US 9,464,357 B2
(45) Date of Patent: Oct. 11, 2016

(54) METHOD FOR OPERATING A HIGH-PRESSURE ELECTROLYSIS SYSTEM, HIGH-PRESSURE ELECTROLYSIS SYSTEM AND HYDROGEN FILLING STATION COMPRISING A HIGH-PRESSURE ELECTROLYSIS SYSTEM

(71) Applicant: SIEMENS AKTIENGESELLSCHAFT, München (DE)

(72) Inventors: Jochen Herold, Weismain (DE); Martin Kautz, Erlangen (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 0 days.

(21) Appl. No.: 14/888,867

(22) PCT Filed: Mar. 4, 2014

(86) PCT No.: PCT/EP2014/054115
§ 371 (c)(1),
(2) Date: Nov. 3, 2015

(87) PCT Pub. No.: WO2014/183893
PCT Pub. Date: Nov. 20, 2014

(65) Prior Publication Data
US 2016/0083855 A1    Mar. 24, 2016

(30) Foreign Application Priority Data

May 16, 2013  (EP) .................................... 13167998

(51) Int. Cl.
*C25B 1/12* (2006.01)
*C25B 15/08* (2006.01)
*F17C 5/06* (2006.01)

(52) U.S. Cl.
CPC ................. *C25B 1/12* (2013.01); *C25B 15/08* (2013.01); *F17C 5/06* (2013.01); *F17C 2221/012* (2013.01); *F17C 2223/035* (2013.01); *F17C 2223/04* (2013.01); *F17C 2225/036* (2013.01); *F17C 2227/0157* (2013.01); *F17C 2227/0341* (2013.01); *F17C 2270/01* (2013.01); *Y02E 60/366* (2013.01)

(58) Field of Classification Search
CPC ....................................................... C25B 1/12
See application file for complete search history.

(56) References Cited

U.S. PATENT DOCUMENTS

| 1,952,281 A | 12/1932 | Georges |
| 2008/0047502 A1* | 2/2008 | Morse ........................ C25B 1/12 123/3 |
| 2009/0322090 A1* | 12/2009 | Wolf .......................... C25B 1/12 290/52 |

FOREIGN PATENT DOCUMENTS

| DE | 10307112 A1 | 10/2003 |
| DE | 102008052827 A1 | 5/2010 |
| JP | 2007309375 A | 11/2007 |

OTHER PUBLICATIONS

International Search Report issued by the European Patent Office in International Application PCT/EP2014/054115.

*Primary Examiner* — Nicholas A Smith
(74) *Attorney, Agent, or Firm* — Henry M. Feiereisen LLC

(57) ABSTRACT

The invention relates to a method for operating a high-pressure electrolysis system (2), wherein a hydrogen stream (6) and an oxygen stream (8) are produced in a high-pressure electrolyzer (4), and these are passed out of the high-pressure electrolyzer (4) under high pressure. In order to increase the efficiency of the high-pressure electrolysis system (2) with respect to cooling of the hydrogen produced in the high-pressure electrolysis system (2), the oxygen stream (8) is passed into a vortex tube (20) for decompression, in which the pressure energy of the oxygen is converted to refrigeration. This produces a cold oxygen stream (22) which is used to cool the hydrogen stream (6).

20 Claims, 2 Drawing Sheets

METHOD FOR OPERATING A HIGH-PRESSURE ELECTROLYSIS SYSTEM, HIGH-PRESSURE ELECTROLYSIS SYSTEM AND HYDROGEN FILLING STATION COMPRISING A HIGH-PRESSURE ELECTROLYSIS SYSTEM

CROSS-REFERENCES TO RELATED APPLICATIONS

This application is the U.S. National Stage of International Application No. PCT/EP2014/054115, filed Mar. 4, 2014, which designated the United States and has been published as International Publication No. WO 2014/183893 and which claims the priority of European Patent Application, Serial No. 13167998.7, filed May 16, 2013, pursuant to 35 U.S.C. 119(a)-(d).

BACKGROUND OF THE INVENTION

Nowadays one of the ways used to create hydrogen is by PEM electrolysis. A component of a PEM electrolyzer is a proton exchange membrane (PEM), which is contacted on both sides by porous platinum electrodes (anode and cathode). During operation of a high-pressure electrolyzer based on PEM technology, i.e. of an electrolyzer with an operating pressure of 30 bar to around 100 bar, two separate water circuits, namely an anode-side and a cathode-side water circuit, are realized. An external voltage is applied to the electrodes and water is supplied to the anode side of the electrolyzer. Through the catalytic effect of the platinum the water on the anode side is broken down. This produces oxygen, free electrons and positively-charged hydrogen ions $H^+$. The hydrogen ions $H^+$ diffuse through the proton exchange membrane (PEM) to the cathode side, where they combine with the electrons from the external circuit to form hydrogen molecules $H_2$.

Creation of hydrogen on a large scale by means of electrolysis, especially as part of energy transition, can make a significant contribution to balancing out fluctuating provision of power from renewable energies. In such cases water electrolysis is preferably used during temporary energy peaks by regenerative feeders (wind, photovoltaic).

The electrolysis process is used for example to create hydrogen as a fuel for vehicles. Current filling stations for hydrogen (within the framework of demonstration projects for example) basically consist of the three sections "hydrogen creation", "hydrogen storage" and "compression and fuelling system". The section "hydrogen creation" is either provided centrally (mostly by means of "natural gas or steam reforming") and the hydrogen obtained is then delivered by means of special tankers to the filling stations and is put into intermediate storage there in tanks, or it is created on site, but is then put into intermediate storage in tanks until it is used.

During operation of a high-pressure electrolysis system oxygen is created at around 50 bar for example. Until now the pressurized oxygen has been decompressed to atmospheric pressure and discharged into the environment. There is not currently any provision for using the oxygen or the pressure energy of the oxygen.

SUMMARY OF THE INVENTION

The underlying object of the invention is to make it possible to improve the energy efficiency of a high-pressure electrolysis system, which is used in particular for producing hydrogen for a hydrogen filling station. Another underlying object of the invention is to improve the energy balance of a hydrogen filling station in which hydrogen is created in a high-pressure electrolysis system.

The first object is achieved in accordance with the invention by a method for operating a high-pressure electrolysis system, wherein in a high-pressure electrolyzer, especially a PEM high-pressure electrolyzer, a hydrogen stream and an oxygen stream are produced which are conveyed at high pressure out of the high-pressure electrolyzer, the oxygen stream is introduced into a vortex tube for decompression, in which the pressure energy of the oxygen is converted into cold, wherein a cold oxygen stream is created, the cold oxygen stream is used for cooling the hydrogen stream.

The first object is further achieved in accordance with the invention by a high-pressure electrolysis system comprising a high-pressure electrolyzer, especially a PEM high-pressure electrolyzer, for producing a hydrogen stream and an oxygen stream, wherein a hydrogen line or an oxygen line lead out of the high-pressure electrolyzer, further comprising a vortex tube integrated into the oxygen line for decompressing the oxygen stream, wherein a cold oxygen line is provided for a cold oxygen stream, leading from the vortex tube, which is connected in flow terms with the hydrogen line.

The second object is additionally achieved in accordance with the invention by a hydrogen filling station with such a high-pressure electrolysis system.

The benefits and preferred embodiments given below in relation to the method can be transferred analogously to the high-pressure electrolysis system and the hydrogen filling station.

"Under high pressure" here refers to a pressure level of the hydrogen stream and the oxygen stream, which lies at several bar above atmospheric pressure. Such a pressure level is characteristic of a high-pressure electrolysis system. The pressure of the two streams preferably lies between 30 bar and 100 bar.

The invention is based on the idea of using the pressure energy of the oxygen which is released during operation of the high-pressure electrolysis system to cool the hydrogen which is produced at the same time as the oxygen in the high-pressure electrolysis system. In order to achieve this an integrated circuit of the material and energy streams of the high-pressure electrolysis system is provided. The otherwise unused energy potential of the oxygen is thus fed back into the hydrogen process.

The pressure energy of the oxygen is converted into cold here in a vortex tube, which is built into the oxygen line of the electrolyzer. Vortex tubes have been known for decades. For example a vortex tube is described in U.S. Pat. No. 1,952,281 A. Nowadays vortex tubes are used for industrial applications in refineries for example. Since a vortex tube is a static device, use of a vortex tube in a high-pressure electrolysis system is associated with relatively low financial outlay. Only minimal maintenance costs arise in such applications since a vortex tube has no moving parts.

The pressurized oxygen from the oxygen line is blown at a tangent into the vortex tube and rapid rotation is imparted to it. During this process, as a result of the high centripetal forces, the oxygen stream divides into a hot and a cold stream, which will be referred to below as the cold oxygen stream and the hot oxygen stream. The cold oxygen stream is conveyed out of the vortex tube and supplied to the hydrogen stream. When cooling of the hydrogen stream is necessary, for example during a compression process of the hydrogen, the temperature of the hydrogen is then reduced with the cold oxygen from the vortex tube.

A typical application, for which a cooling of the hydrogen stream is necessary, is when the hydrogen from high-pressure electrolysis is used as fuel for a hydrogen filling station, since, during compression for the fuelling process, the hydrogen temperature rises to several hundred degrees C. In a hydrogen filling station with a high-pressure electrolysis system in such cases the spatial proximity and the infrastructure are available for implementing the cold oxygen stream from the vortex tube for cooling the hydrogen during the fuelling process with little technical outlay.

Depending on requirements for the quantity of cold oxygen, a number of vortex tubes can also be used.

The other stream arising in the vortex tube, i.e. the hot oxygen stream, can be used for heating purposes within the high-pressure electrolysis system or outside said system. As an alternative the hot oxygen stream is discharged to the environment.

Preferably the oxygen stream, before its decompression, is stored in a pressure vessel, which is disposed in the oxygen line upstream of the vortex tube. Through the intermediate storage and subsequent use of the pressurized oxygen in the vortex tube the refrigeration potential of the pressurized oxygen can be utilized as required. This means that the cold oxygen stream is especially only created if cooling of the hydrogen is immediately necessary. If there is no need for cooling, the oxygen is first stored.

In accordance with a further preferred embodiment variant an additional gas under high pressure, especially oxygen, is fed from an external source to the pressurized container under high pressure. The additional gas is especially compressed to a pressure, which corresponds to the pressure of the oxygen stream in the oxygen line (for example around 50 bar). If the refrigeration potential of the oxygen generated in the electrolyzer is not sufficient to cool the entire hydrogen produced in parallel in the high-pressure electrolysis system, additional cooling sources are required for cooling the hydrogen. Further coolants supplementing the cooling with cold oxygen can be dispensed with here since a comparatively large amount of compressed oxygen (or compressed oxygen mixed with another gas) is made available, which is used for cooling purposes. Since the quantity of oxygen required for this purpose cannot be produced solely in the high-pressure electrolysis system, further sources of oxygen are procured so that sufficient oxygen under high pressure is made available. Cooling on demand is thus made possible, which is based entirely on the use of the pressure energy of compressed oxygen.

Expediently the oxygen is cooled in the vortex tube to below 0° C., especially to below −20° C., especially to below −40° C. The temperature here is a function of the design of the vortex tube. The lower the temperature of the cold oxygen stream is, the more effective is the cooling of the hydrogen. Therefore the minimum temperatures able to be achieved by the vortex tube are obtained.

Preferably the hydrogen stream is cooled during compression to a pressure of around 700 bar, especially to a pressure of around 800 bar, by means of the cold oxygen stream. A compressor built into the hydrogen line is used for this purpose. Since, when the hydrogen is compressed to such a high pressure, its temperature increases greatly, the compressor in the hydrogen line is cooled by means of the cold oxygen stream. As an alternative the hydrogen can be cooled before the compression, so that it is fed to the compressor at a very low temperature.

Preferably the hydrogen is intended for fuelling motor vehicles and it is cooled with the cold oxygen stream before a fuelling process. A fuel pump is preferably connected here downstream from the compressor in the hydrogen line. The compressor itself can be part of a filling station, which comprises one or more fuel pumps, which are located downstream from the compressor.

As an alternative a pipeline, which is not initially an end user of the hydrogen, can be connected downstream from the compressor.

The hydrogen filling station preferably has a cooling network for supplying the devices of the filling station with cold, wherein the cold oxygen line is part of this cold network. A cold infrastructure is created by this, which especially meets the entire demand for cold of the filling station, e.g. for cooling rooms or cooling foodstuffs.

BRIEF DESCRIPTION OF THE DRAWING

Exemplary embodiments of the invention will be explained in greater detail with reference to a drawing, in which.

DETAILED DESCRIPTION OF PREFERRED EMBODIMENTS

Figure 1:
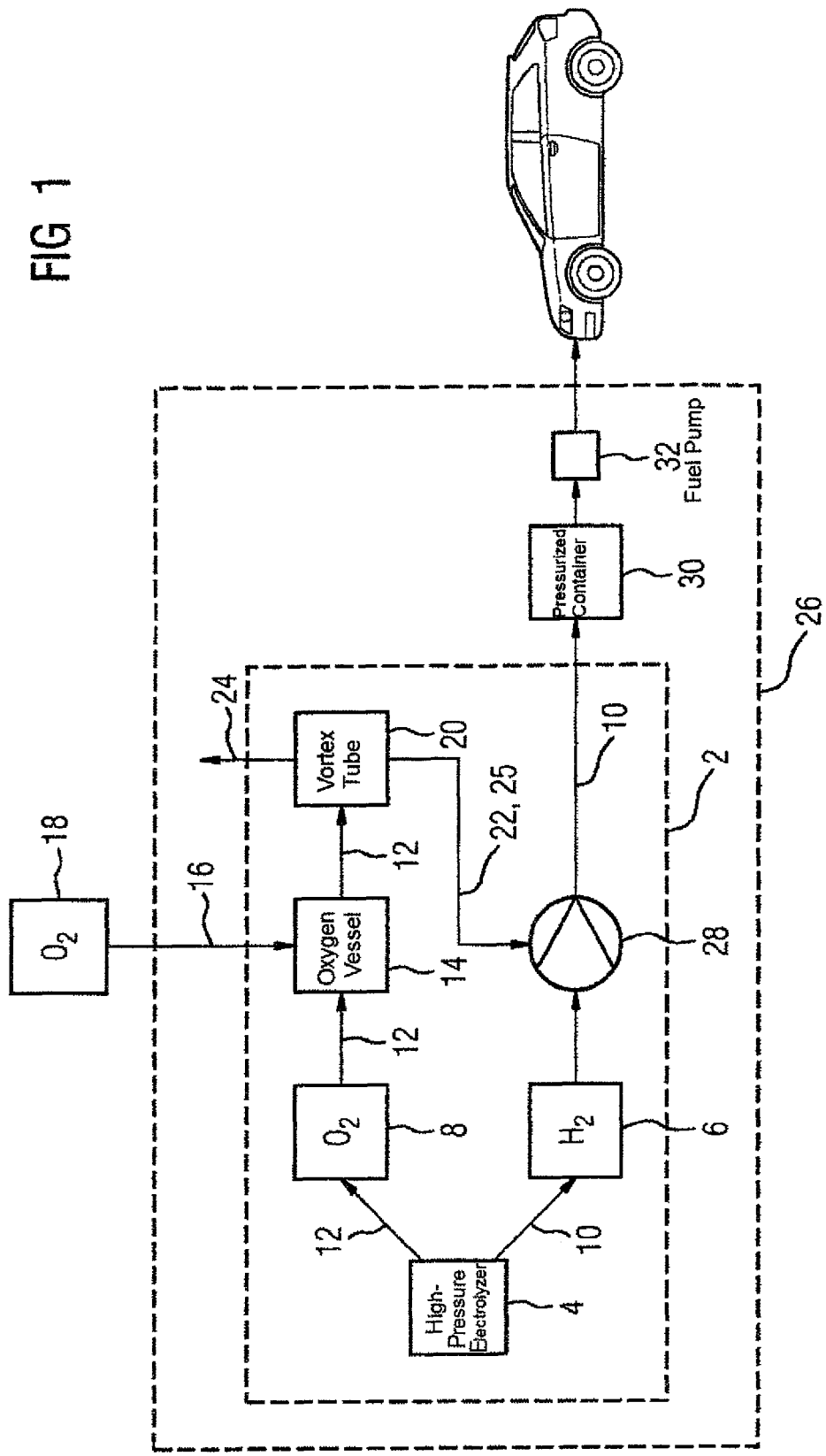
FIG. 1 shows the flow connections between a high-pressure electrolysis system and a hydrogen filling station.

The same reference characters have the same meaning in the various figures.

FIG. 1 shows a high-pressure electrolysis system 2, which comprises a so-called high-pressure electrolyzer 4 for producing a hydrogen stream 6 and an oxygen stream 8. In the exemplary embodiment shown the high-pressure electrolyzer 4 is a PEM high-pressure electrolyzer 4. Accordingly a hydrogen line 10 and an oxygen line 12 are provided for the hydrogen stream 6 and the oxygen stream 8, through which the respective gas is conveyed out of the PEM high-pressure electrolyzer 4 at high pressure, especially at a pressure of above 30 bar, e.g. at 50 bar. A temperature of around 60° C. obtains in this case in the hydrogen line 10 and the oxygen line 12.

In accordance with FIG. 1 a compressed oxygen vessel 14 is integrated into the oxygen line 12, in which oxygen is stored from the PEM high-pressure electrolyzer 4 over a period of time. In the exemplary embodiment shown a line 16 is also provided, via which oxygen is fed from an external source 18, such as for example oxygen from another electrolysis system not shown here, into the compressed oxygen vessel 14. The oxygen of the external source 18 is likewise at high pressure here, especially at a pressure of around 50 bar, the same pressure as the oxygen in the oxygen line 12. The pressure vessel 14 guarantees a demand-driven provision of oxygen, especially when large quantities of oxygen are used. However the oxygen from the external source 18 and the pressure vessel 14 can be dispensed with, especially if oxygen is continuously being used.

A vortex tube 20 is connected downstream from the pressure vessel 14. The vortex tube represents a decompression device, in which the oxygen stream 8 is divided into a cold oxygen stream 22 and a hot oxygen stream 24. The hot oxygen stream 24 here is discharged here into the environment, as an alternative however it can be used for heating purposes for example. The cold oxygen stream 22 is used again for cooling the hydrogen stream 6 of the PEM high-pressure electrolyzer 4, therefore the cold oxygen stream 22 is transported via a cold oxygen line 25 to the hydrogen stream 6. After the vortex tube 20 the cold oxygen stream 22 is cooled to a temperature of below 0° C., especially to a temperature of around −40° C.

A cooling of the hydrogen stream 6 is especially necessary by virtue of its use as a propellant in a hydrogen filling station 26, of which the high-pressure electrolysis system 2 is a part. For this the hydrogen stream 6 is compressed after the PEM high-pressure electrolyzer 4 by means of a compressor 28 to a pressure of at least 700 bar, especially to 800 bar. The compressed hydrogen is then stored in a pressurized container 30 of the hydrogen filling station 26. The hydrogen is used as required via a fuel pump 32 for fuelling a motor vehicle.

During compression of the hydrogen stream 6 before the fuelling process the hydrogen heats up very greatly. To prevent too much heat developing, the compressor 28 is cooled during this process by means of the cold oxygen stream 22. If the cooling potential of the cold oxygen stream 22 is not sufficient to cool the hydrogen stream 6, further cooling means are also able to be used as a supplement to the cold oxygen stream 22. It is true to say here that the lower the temperature of the hydrogen stream 6 is, the higher is the efficiency of the compression. For storage of especially large quantities of compressed oxygen, which is made possible by tapping of external oxygen sources 18, in an arrangement in accordance with FIG. 1 sufficient cold oxygen can be made available, in order, solely through oxygen which is decompressed by one or more vortex tubes and is cooled thereby, to completely cool the hydrogen in the fuel pump 32.

In FIG. 1 the compressor 28 is shown as a component of the high-pressure electrolysis system 2. As an alternative, especially when the hydrogen is not created directly at the fuelling location, the compressor 28, because of its spatial proximity to the fuel pump 32, is part of the hydrogen filling station 26.

Figure 2:
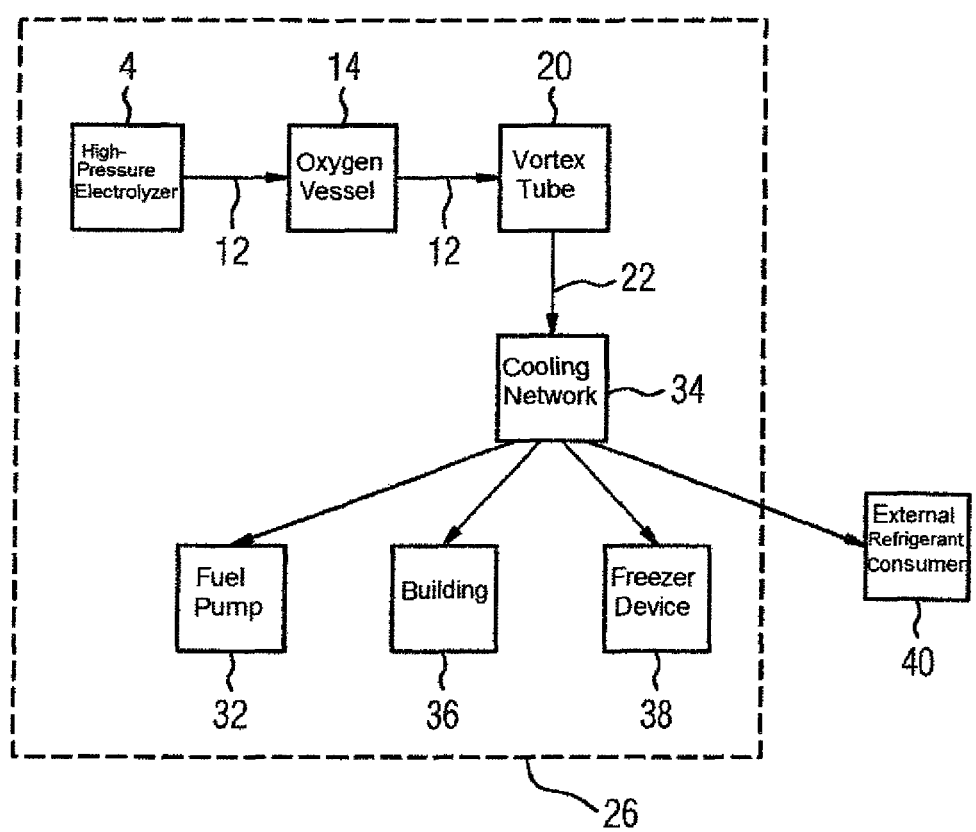
FIG. 2 shows a refrigeration network of a hydrogen filling station.

Further applications for the use of the cold oxygen stream 22 are shown in FIG. 2. The cold oxygen stream 22 is fed to a cooling network 34, from which the cold is distributed into the infrastructure of the hydrogen filling station 26. The refrigeration potential of the cold oxygen stream 22 is not only used here for cooling a fuelling process at the fuel pump 32 of the hydrogen filling station 26, but the cold oxygen is also used for cooling buildings, such as the building of the filling station 26 for example, which is indicated by block 36, or for cooling foodstuffs in a freezer device 38 within the filling station, shown by block 38 in FIG. 2. In the exemplary embodiment according to FIG. 2, cold oxygen is also separated off to supply an external refrigerant consumer 40 which is not a part of the infrastructure of the hydrogen filling station, but is however located in the vicinity of the hydrogen filling station 26.

The invention claimed is:

1. A method for operating a high-pressure electrolysis system, comprising:
   producing a hydrogen stream and an oxygen stream in a high-pressure electrolyzer;
   conveying the hydrogen stream and the oxygen stream at high pressure out of the high-pressure electrolyzer;
   introducing the oxygen stream into a vortex tube for decompression to convert pressure energy of oxygen into cold and thereby create a cold oxygen stream; and
   using the cold oxygen stream for cooling the hydrogen stream.

2. The method of claim 1, wherein the high-pressure electrolyzer is a PEM high-pressure electrolyzer.

3. The method of claim 1, further comprising storing the oxygen stream before decompression in a pressure vessel.

4. The method of claim 3, further comprising supplying an additional gas from an external source at high pressure to the pressure vessel.

5. The method of claim 4, wherein the additional gas is oxygen.

6. The method of claim 1, wherein the oxygen stream is cooled down in the vortex tube below 0° C.

7. The method of claim 1, wherein the oxygen stream is cooled down in the vortex tube below −20° C.

8. The method of claim 1, wherein the oxygen stream is cooled down in the vortex tube to about −40° C.

9. The method of claim 1, further comprising decompressing the hydrogen stream to a pressure of at least about 700 bar, as the hydrogen stream is cooled by the cold oxygen stream.

10. The method of claim 1, further comprising decompressing the hydrogen stream to a pressure of at least about 800 bar, as the hydrogen stream is cooled by the cold oxygen stream.

11. The method of claim 1, wherein the hydrogen stream is cooled by the cold oxygen stream before hydrogen is used for fuelling a motor vehicle.

12. A high-pressure electrolysis system, comprising:
   a high-pressure electrolyzer configured to produce a hydrogen stream and an oxygen stream;
   a hydrogen line connected to the high-pressure electrolyzer for conveying the hydrogen stream out of the high-pressure electrolyzer;
   an oxygen line connected to the high-pressure electrolyzer for conveying the oxygen stream out of the high-pressure electrolyzer;
   a vortex tube integrated into the oxygen line for decompression of the oxygen stream to thereby produce a cold oxygen stream; and
   a cold oxygen line for conveying the cold oxygen stream from the vortex tube, said cold oxygen line being connected in flow communication to the hydrogen line.

13. The high-pressure electrolysis system of claim 12, wherein the high-pressure electrolyzer is a PEM high-pressure electrolyzer.

14. The high-pressure electrolysis system of claim 12, further comprising a pressure vessel disposed in the oxygen line upstream of the vortex tube.

15. The high-pressure electrolysis system of claim 14, wherein the pressure vessel is connected to an external source for supply of a gas at high pressure.

16. The high-pressure electrolysis system of claim 15, wherein the gas is oxygen.

17. The high-pressure electrolysis system of claim 12, further comprising a compressor integrated into and in fluid communication with the hydrogen line for compressing hydrogen to a pressure of at least about 700 bar, especially to a pressure of about 800 bar.

18. The high-pressure electrolysis system of claim 17, further comprising a fuel pump connected downstream of the compressor in the hydrogen line.

19. A hydrogen filling station, comprising a high-pressure electrolysis system which includes a high-pressure electrolyzer configured to produce a hydrogen stream and an oxygen stream, a hydrogen line connected to the high-pressure electrolyzer for conveying the hydrogen stream out of the high-pressure electrolyzer, an oxygen line connected to the high-pressure electrolyzer for conveying the oxygen stream out of the high-pressure electrolyzer, a vortex tube integrated into the oxygen line for decompression of the oxygen stream to thereby produce a cold oxygen stream, and a cold oxygen line for conveying the cold oxygen stream from the vortex tube, said cold oxygen line being connected in flow communication to the hydrogen line.

20. The hydrogen filling station of claim 19, further comprising a cooling network for supplying devices of the filling station with cold, said cold oxygen line being part of the cooling network.

* * * * *